Patented June 21, 1938

2,121,502

UNITED STATES PATENT OFFICE 2,121,502

STARCH

Carl C. Kesler, Cedar Rapids, Iowa, assignor to Penick & Ford, Ltd., Incorporated, a corporation of Delaware No Drawing. Application May 4, 1936, Serial No. 77,862

4 Claims. (Cl. 127—33)

This invention relates to starch, and more particularly to a modified starch product.

The object of the invention is to provide a new method for preparing a starch product which may be employed in the making of paper and for other uses such as textile sizing, as a basic material for manufacture of derivatives such as explosives, various esters, laundry starch, and numerous other uses. A further object is to provide a starch product which may be readily dried in the ordinary drying apparatus used in starch factories and thereby adapted for various uses. A further object is to provide a new method in which a new and more effective disintegration-inhibitor is employed, the inhibitor being recovered in apparatus employed in connection with the drying step. Other specific objects and advantages will appear as the specification proceeds.

The starch product, either as a dry or wet product, is characterized in that the crosses of the granules have disappeared when observed with crossed nicols. At the same time, in spite of the enlargement, the granules remain as substantially unitary granules. Apparently, the beta amylose or inner portion of the granules swell along with the alpha amylose and stretch the granule to or near its bursting point. The outside of the granule is slightly gelatinous, thus making it capable of a limited bonded action. The granules, when suspended in water, remain suspended in concentrations in which an ordinary starch suspension would settle out. The dry product is highly reversible, readily hydrating to a degree approaching that of unmodified starch when cooked with water. It is preferably free from a gelatinization-inhibitor.

When the product is dried to commercial ($H_2O$) moistures, it may be ground in a mill giving a product which may be readily re-used upon again being mixed with water.

I have discovered that the new product can be effectively produced through the use of a volatile organic disintegration-inhibitor, such as, for example, a hydrogenated phenol, when the water-starch concentration is being heated. I prefer the water-starch concentration of approximately 50%, although, for different conditions, the concentration should be varied. The hydrogenated phenols serve as inhibitors, preventing substantial disintegration of the starch until the final product has been obtained. I prefer to use an inhibitor which will volatilize below 250° F. As the temperature is raised to temperatures that are ordinarily employed for the gelatinization of commercial starches, the starch granules expand, but under the influence of the inhibitor, do not disintegrate to any substantial extent. Although very substantially enlarged, they remain, to a predominant degree, as unitary bodies or individual granules.

When the crosses, which are characteristic of the original granules, have disappeared, and before disintegration of the granules, I discontinue the heating. The product may then be used directly in the manufacture of paper, or for other uses. If desired, it may first be dried.

When the starch has reached the condition described above, it becomes crumbly and is in a state in which it dries readily. I prefer to carry on the drying operation in a vacuum dryer to which is connected a surface condenser. The hydrogenated phenol, or other volatile inhibitor, is recovered in the condenser and may be used again.

I have found two definite advantages in the use of the hydrogenated phenols as retarders for inhibitors. One advantage is that they produce a highly hydratable or reversible product, and another is that they may be removed by distillation and condensation or extraction and used again.

Among the hydrogenated phenols, I find that hexalin and tetralin are particularly effective, both from the standpoint of their use as inhibitors and from the standpoint of substantially complete recovery. My best results have been obtained with hexalin.

As a specific example of my process, the following proportions may be given:

| | Pounds |
|---|---|
| Commercial starch | 1,000 |
| $H_2O$ | 1,000 |
| Hexalin | 50 |

The above mixture is heated until the crumbly material is obtained. The temperature at which a satisfactory product has been obtained with corn starch is approximately 185° F. It will be understood that the temperature varies for different conditions, different kinds of starch, different types of inhibitors. I find that there is a definite inter-relation between temperature, inhibitor, and water-starch concentrations.

In the above specific example, the crumbly material was dried in a vacuum dryer connected to a surface condenser, and the hexalin was recovered for reuse.

The dried product is a mealy or fluffy material which can be made effective for the various uses by rewetting. It contains no portion of the inhibitor which might otherwise re-act with and adversely affect other ingredients in the paper-manufacturing process or other processes.

While, in the foregoing description, I have set forth certain specified proportions and conditions, it will be understood that these are stated by way of example and that they may be modified greatly under different conditions and for different starch materials without departing from the spirit of my invention.

The foregoing detailed description has been given for clearness of understanding only, and no unnecessary limitations should be understood therefrom, but the appended claims should be construed as broadly as permissible, in view of the prior art.

I claim:

1. A method for preparing a starch product comprising: heating starch granules in water in the presence of a volatile disintegration-inhibitor until the crosses of said granules have disappeared as observed through crossed nicols, discontinuing the heating while the bulk of the granules are non-disintegrated, drying said starch granules while at the same time volatilizing said inhibitor, and recovering said inhibitor by condensation.

2. A method for preparing a starch product, comprising: heating starch granules in water in the presence of hexalin until the crosses of said granules have disappeared as observed through crossed nicols, and discontinuing the heating while the bulk of the granules are non-disintegrated.

3. A method for preparing a starch product, comprising: heating starch granules in water in the presence of tetralin until the crosses of said granules have disappeared as observed through crossed nicols, and discontinuing the heating while the bulk of the granules are nondisintegrated.

4. A method for preparing a starch product, comprising: heating starch granules in water in the presence of hexalin until the crosses of said granules have disappeared as observed through crossed nicols, discontinuing the heating while the bulk of the granules are non-disintegrated, drying said granules, and recovering said hexalin by condensation.

CARL C. KESLER.